Nov. 1, 1927.  
N. TRBOJEVICH  
METHOD OF PRODUCING GEARS  
Original Filed Jan. 7, 1924  4 Sheets-Sheet 1

Nikola Trbojevich  
INVENTOR

BY  
ATTORNEY

Nikola Trbojevich
INVENTOR

BY *Schlesinger*
ATTORNEY

Nov. 1, 1927.                     1,647,158
N. TRBOJEVICH
METHOD OF PRODUCING GEARS
Original Filed Jan. 7, 1924    4 Sheets-Sheet 3

Nikola Trbojevich
INVENTOR

BY /s/ Schlesinger
ATTORNEY

Nov. 1, 1927.

N. TRBOJEVICH 1,647,158

METHOD OF PRODUCING GEARS

Original Filed Jan. 7, 1924    4 Sheets-Sheet 4

Fig. 9

Nikola Trbojevich
INVENTOR

BY *[signature]*

ATTORNEY

Patented Nov. 1, 1927.

1,647,158

UNITED STATES PATENT OFFICE.

NIKOLA TRBOJEVICH, OF HIGHLAND PARK, MICHIGAN, ASSIGNOR TO GLEASON WORKS, OF ROCHESTER, NEW YORK, A CORPORATION OF NEW YORK.

METHOD OF PRODUCING GEARS.

Original application filed January 7, 1924, Serial No. 684,862. Divided and this application filed January 14, 1926. Serial No. 81,218.

The present invention relates to a method of producing gears and particularly to a method of producing gears having longitudinally curved teeth.

The purpose of the present invention is to provide a simple and inexpensive method of hobbing curved tooth gears, particularly tapered gears having curved teeth such as form the gear or wheel member of the pairs of hyperboloidal gears described in my application No. 684,862, filed January 7, 1924, of which the present application is a division.

The present invention provides a method of hobbing curved tooth gears, particularly gears of the type described in the above mentioned application, which will be simple and rapid in operation and of comparatively low cost.

With the above and other objects in view, the present invention resides in certain improvements and in the novel steps constituting the invention, as will be hereinafter more fully described and pointed out in the appended claims.

The present invention is based upon the discovery that curved tooth gears and particularly tapered curved tooth gears may be hobbed in a hobbing process in which the tool and blank are rotated in continuous intermeshing engagement without imparting the usual rolling motion. The gear is hobbed by a timed rotation in engagement with the hob, in combination with a simple relative feeding movement between hob and blank necessary to cut the teeth on the gear to the required depth. By doing away with the rolling motion it is possible to simplify the hobbing machinery and process and to produce gears in a shorter time and more cheaply. The present invention is particularly applicable to the manufacture of the curved tooth hyperboloidal gear which forms one member of the pair described in the parent application above referred to. In producing this gear, the hob employed is formed by gashing a thread of the same form as the thread of the worm with which the gear is intended to mesh.

In order to understand the principle upon which this invention is based, it is necessary first to consider certain mathematical and kinematical pecularities upon which the system is founded.

Figure 1:
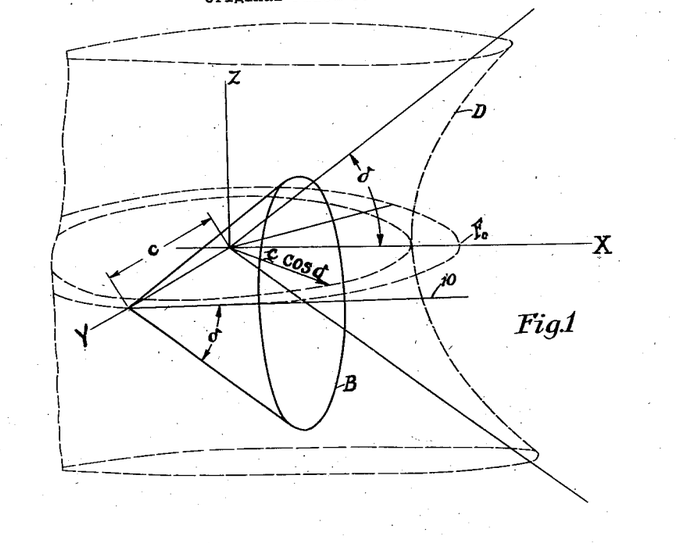
Fig. 1 is a diagrammatic view illustrating the theory upon which the present invention is based.

Referring first to Fig. 1. If a cone B having a cone $\delta$ is so placed with respect to an orthogonal system of coordinates XYZ that its axis 10 lies in the XY plane at a distance $c$ from the Z axis, and its apex A is also at the same distance $c$ from said axis; and if the cone is rotated about that axis Z, then the cone B will envelop a hyperboloid of revolution of one sheet, D, the mathematical equation of which is:

$$\frac{x^2 + y^2}{c^2 \cos^2 \delta} - \frac{z^2}{c^2 \sin^2 \delta} = 1 \quad (1)$$

An analysis of the above equation discloses the following facts: First, the angle of obliquity of the generated hyperboloid is equal to the cone angle $\delta$ of the cone B; second, the apex of the cone lies in the focal circle $F^\circ$ of the meridian hyperbola of said hyperboloid, and third, the cone B always touches the generated hyperboloid along a plane curve, in particular, along a hyperbola, the equation of which in a plane parallel to the XZ plane is:

$$\frac{x^2}{c^2 \sin^2 \delta \cos^2 \delta} - \frac{z^2}{c^2 \sin^4 \delta} = 1 \quad (2)$$

$$y = c \cos^2 \delta$$

The hyperbola defined by the equations (2) is what is termed in mathematics the characteristic of the system, that is, it lies both on the cone B and on the generated hyperboloid, at the same time. The angle of obliquity of said hyperbola is also equal to the cone angle $\delta$, while its transverse and conjugate half axes are $c \sin \delta \cos \delta$ and $c \sin^2 \delta$ respectively.

It is now evident from the above demonstration, that it is both possible (theoretically) to construct a pair of mating gears, the pitch surfaces of which are a cone and a hyperboloid respectively and also that it is possible to employ a tool of taper form to produce a hyperboloidal gear. To produce a practical hyperboloidal gear a tool must be employed whose cutting edges are so arranged that they will cut without mutilation teeth upon the blank.

Figure 2:
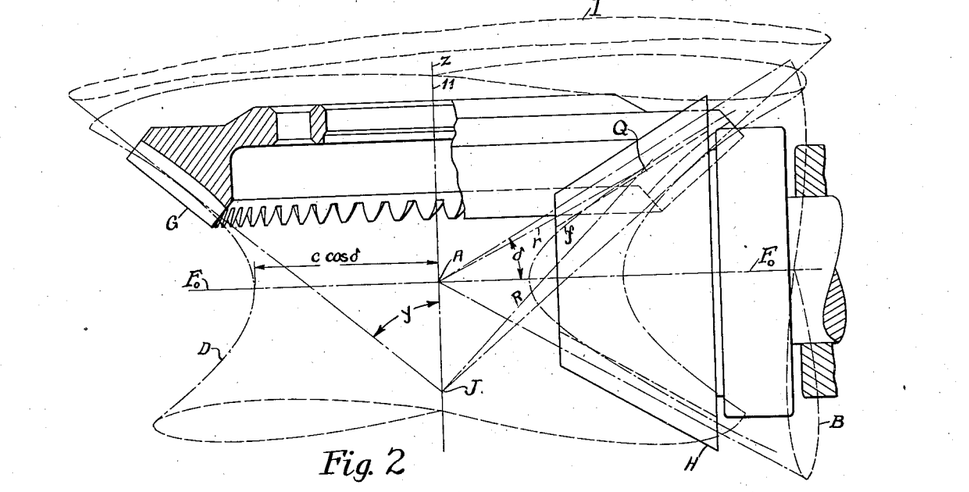
Fig. 2 is a side elevational view, showing somewhat diagrammatically a hob such as might be employed in practising this invention in cutting engagement with the gear being cut thereby.
Figure 3:
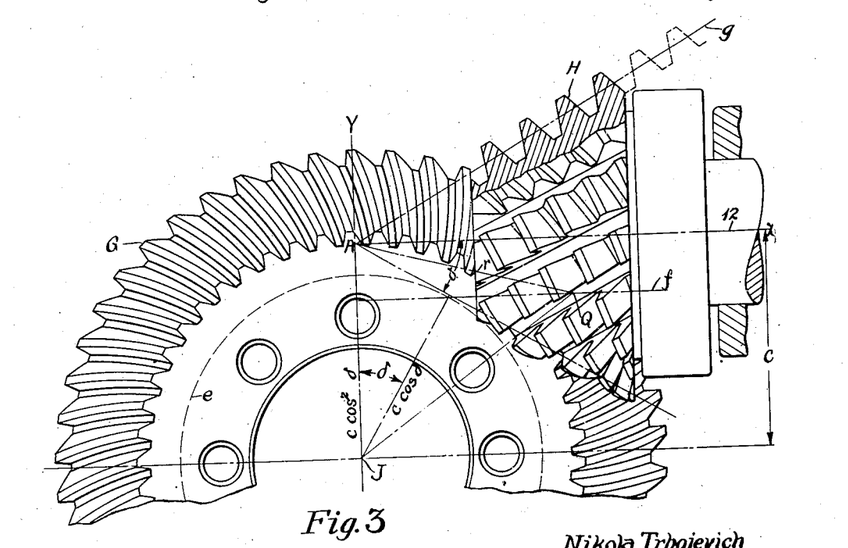
Fig. 3 is a plan view of the hob and gear shown in Fig. 2.

Such a gear may be cut by employing a taper hob of the modified involute type. The method of calculating the tool settings and demonstrating the practical application of this method of cutting gears will now be described. In Figs. 2 and 3 are shown two views of a taper hob of the type described in cutting engagement with a gear such as may be produced by this invention. The taper hob H has a cone angle $\delta$, preferably 30 degrees and a constant lead, that is, its axial sections are the straight rack elements $g$. The gear G to be cut is placed relatively to the hob H in such manner that its axis 11 is perpendicular to the axis 12 of the hob, and the shortest distance between these two axes is equal to $c$. It can be proved mathematically from the equations (1) and (2) that the gorge circle $e$ of the pitch hyperboloid D has a radius equal to $c \cos \delta$, while the distance of the characteristic hyperbola $f$ measured from the axis 11 of the gear G is equal to $c \cos^2 \delta$ and to $c \sin^2 \delta$ when measured from the axis 12 of the hob H (Fig. 3).

Now when the hob and the gear blank are rotated at the proper ratio, the hob will cut longitudinally curved teeth on the blank and without mutilation. This can be demonstrated by studying the nature of the contact which takes place between these two bodies when they are rotated on their axes in intermeshing timed relation. In order to study the nature of this contact, we first assume a point Q lying on the characteristic hyperbola $f$, and investigate the conditions of contact in the neighborhood of the point Q. As the hyperboloid D is not developable into a plane, and in order to represent the neighborhood of the point Q upon a developable surface, we draw a tangent cone I, touching said hyperboloid internally at Q and having its apex at J on the axis 11 of the gear. Thus, the geometrical configuration is of the following form. We have a hyperboloid D and a point Q lying on it. The cones B and I are both tangent to said hyperboloid at Q, the former touching it externally along the hyperbola $f$, and the latter internally along a circle in a plane perpendicular to the Z axis. Therefore, the plane QAJ tangent to the hyperboloid at Q is also tangent to both cones B and I. Furthermore, it contains the two cone apexes A and J. It can be proved mathematically that no matter where the point Q is assumed along the characteristic hyperbola $f$, the triangle QAJ is a right triangle, the right angle being at A.

The existence of this geometrical peculiarity enables us to construct proper longitudinal curves on the face of the hyperboloid D, because the triangle QAJ consists of three sides, the first of which, QA, is the pitch cone radius $r$ of the outer cone B, the second of which, QJ is the pitch cone radius R of the inner cone I, which cone is identical with the hyperboloid along a narrow circular strip passing through Q, and the third of which, AJ, is the apex distance C between the two cones measured in the common tangent plane. Further, $r$ is perpendicular to C. On the other hand an axial section of the hob H along any pitch cone radius or generatrix is the rack element $g$ as already stated. I have shown in my Patent No. 1,465,150 and its companion Patents 1,465,149 and 1,465,151, August 14, 1923, that in a case like this where the rack element is perpendicular to the apex distance C and the hob is provided with a thread which is of Archimedean spiral form, the equation of which is:

$$r = +p\phi_1 \quad (3)$$

where $p$ is the polar sub-normal or the modification of the spiral, and $\phi_1$ is the vectorial angle, that the longitudinal curves of the mating bevel gear must be modified involutes defined by the equations $$x = (a+p) \cos \phi_2 + a\phi_2 \sin \phi_2$$
$$y = (a+p) \sin \phi_2 - a\phi_2 \cos \phi_2 \quad (4)$$

where $a$ is the base radius, and $\phi_2$ the parametric angle. The relation also exists:

$$p\phi_1 = +a\phi_2 \quad (5)$$

As explained in my former patents referred to, the modified involute is a curve odontically conjugate to an Archimedean spiral and is geometrically defined as the tangential curve of a common involute of circle. Thus if we draw a series of tangents to an involute and measure off a constant distance $p$ outwardly upon each of said tangents from their respective points of tangency with the parent curves, the locus obtained is an extended involute, while if the said constant distance $p$ (or the modification) is laid off inwardly, the result is an abridged involute. The Archimedean spiral itself is nothing but a special case of the abridged involute when the amount of inward or negative modification is exactly equal to the base radius of the parent involute.

Two series of modified involutes will correctly mesh together if both are generated by the same rack element (having the same pitch and pressure angle) and if they possess the same amount of modification in absolute value. Thus an Archimedean spiral or a tapered hob of constant pitch, being an abridged involute having a negative modification equal to its polar sub-normal, the exact value of which is $$p = \frac{\text{lead of spiral}}{2\pi} \quad (6)$$

will correctly mesh with extended involutes having a $+p$ modification or with abridged involutes having a $-p$ modification. It is therefore, possible to employ a taper hob of the modified involute type in producing a hyperboloidal gear where the hob is simply rotated in timed relation with the blank while only a simple feed movement is imparted to cut teeth of the proper depth on the blank. With this hob two types of hyperboloidal gears may be constructed, respectively designated as the extended and abridged types, both of which are capable of correctly meshing with a conical screw of constant pitch although the nature of the contact is fundamentally different in each case as more particularly pointed out in my parent application above referred to.

Keeping in mind the above disclosed kinematical laws governing the correct engagement of spiral bevel gearing of the modified involute type, we are now in a position to calculate the proper tooth curves for a hyperboloidal wheel G cut by a taper hob H of the modified involute type. If we denote the coordinates of the point Q (Fig. 2) with $X^0$, $Y^0$, and $Z^0$, these coordinates may be determined from the equation (2) as follows:

$$\begin{aligned} X^0 &= r \cos \delta \\ Y^0 &= c \cos^2 \delta \\ Z^0 &= \sin \delta \sqrt{r^2 - c^2 \sin^2 \delta} \end{aligned} \quad (7)$$

The mathematical theory upon which the present invention is based is rather intricate on account of the complex kinematical relationships existing between the curves employed on the hob and gear. I have, however, devised a practical method of calculating the gearing and of also accurately determining the characteristic angles and distances to which the spindles of the hobbing machine must be set to produce such gearing. In order to accomplish this, I usually first start from the plane development of the curves in the neighborhood of the point Q developed upon the common tangent plane QAJ.

Figures 4, 5:
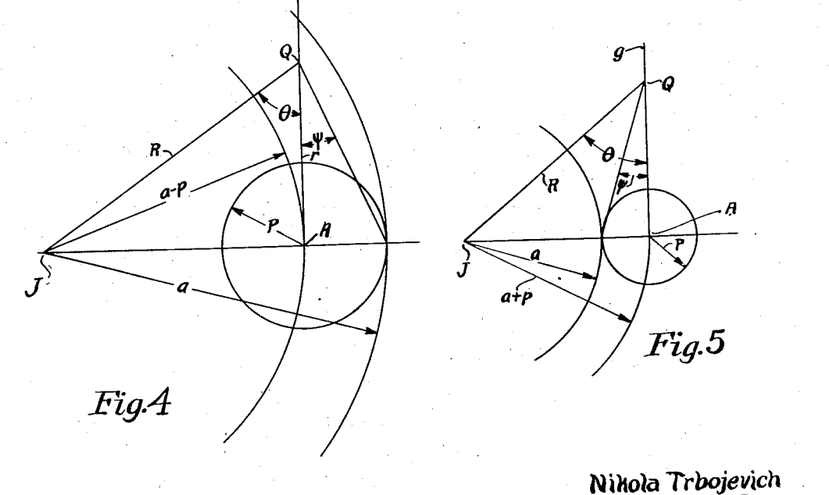
Figs. 4 and 5 are two diagrammatic views illustrating different methods of positioning the hob for cutting a gear according to this invention.

In producing a gear G, the cone angle of the hob, the form of gear tooth curve (extended or abridged involute), the numbers of threads in the hob and of teeth in the gear, and the angle $AQJ = \theta$ are first selected. Suppose that it is desired to produce a gear G having teeth of the abridged involute form, (which type is suitable for the final drives of automobiles and trucks) then Fig. 4 represents the tangent plane QAJ. If the angle $\theta$ be assumed (in the conditions illustrated in Figs. 2 and 3, $\theta = 45°$), and the cone angle of the hob is equal to $\delta$ (in the preferred case, using an Archimedean spiral hob, 30°), the cone angle $\gamma$ of the inner cone I may be determined from the following relation:

$$\tan \gamma \tan \delta = \cos \theta \quad (8)$$

Now, the number of threads in the hob and the number of teeth in the gear, $n'$ and $n_2$ are known as well as the diametral pitch P or lead of the rack element $g$. Hence, the two base radii, $p$ and $a$ are easily determined, as follows:

$$p = \frac{n'}{2P \sin \delta} \quad (9)$$

$$a = \frac{n_2}{2P \sin \gamma} \quad (10)$$

In cutting a gear of the abridged type, the apex distance $C = AJ = a - p$, while in cutting a gear of the extended type the same distance equals $a + p$. Thus C is known from the preceding equations in either case. The radii R and $r$ may also be determined from the right triangle QAJ (Fig. 4) as follows:

$$r = \frac{C}{\tan \theta} \quad (11)$$

$$R = \frac{C}{\sin \theta} \quad (12)$$

The shortest distance $c$ between the axes of the hob and gear may be determined from the equation:

$$c = C \frac{\sin \gamma}{\cos \delta} \quad (13)$$

Fig. 5 shows a diagram analogous to Fig. 4, representing the conditions existing in cutting a gear G of the extended type. Here the modification is equal to $a+p$. In view of the complete analogy, this diagram requires no separate explanation.

Figure 8:
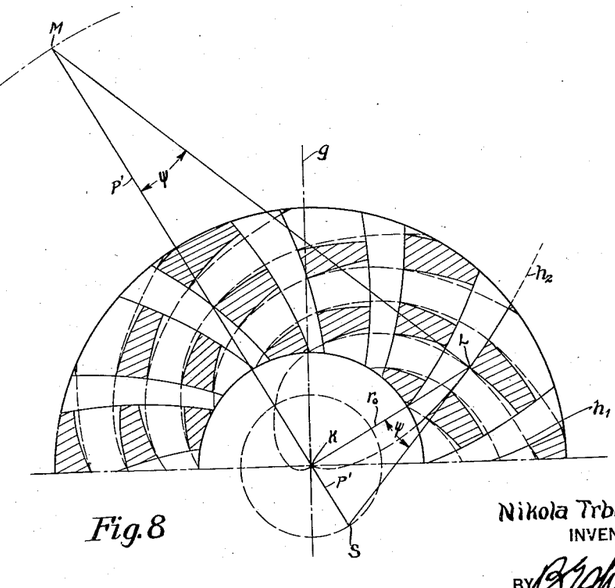
Fig. 8 is a view showing the pitch cone development of one form of hob capable of being employed in practising this invention.

The hob H employed in the preferred form of my invention is provided with a number of straight or spiral flutes and is relieved in a direction perpendicular to the side of the cone as shown in my Patent No. 1,465,151. This hob when employed in producing the wheel of a pair of gears such as described in the parent application No. 684,862, will be an exact counterpart of the tapered worm with which this gear G is adapted to mesh. If the angle $\psi$ (Figs. 4 and 5) is considerable (greater than 8 or 10°) the hob may be provided with spiral flutes, similar to those employed in common spur hobs. Fig. 8 shows the pitch cone development of a tapered hob of constant pitch having spiral flutes. The rack elements $g$ all converge in the apex K as in the straight fluted hobs and the cutting edges are lined up along the Archimedean spiral segments $h'$. The flutes are also Archimedean spirals $h''$ preferably so arranged that they are perpendicular to the thread spirals at the point L, said point lying substantially in the middle of the face of the hob. The polar sub-normal of the flutes, $p'=KM$ may be calculated from the SLM triangle, said value being:

$$p' = \frac{r_0^2}{p} \quad (14)$$

where $r_0$ is equal to the distance KL.

Figure 6:
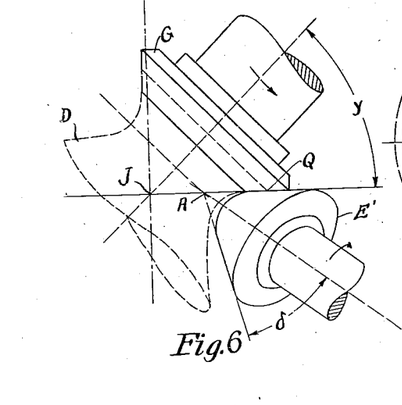
Figs. 6 and 7 are diagrammatic views illustrative of the method of practising this invention.
Figure 7:
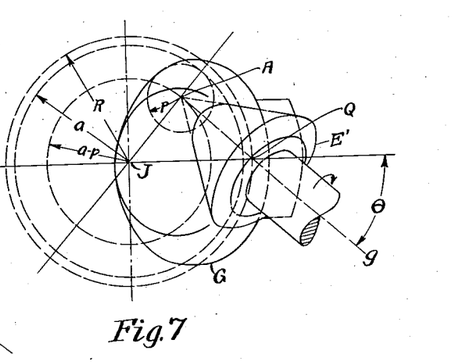

Having determined, as previously explained, the diameter and cone angle of the blank by taking into account the desired number of teeth, the pitch, the angle of tooth curvature, etc., the gear may be cut by positioning the hob and blank in tangential relation and then rotating the hob and blank in timed relation while imparting a relative feed movement between the two until the proper depth of teeth is reached. The direction of rotation is the same for hob and blank if a gear of the extended type is being cut, and opposite (as shown by the arrows in Figures 6 and 7) if a gear of the abridged type is being cut. This intermeshing timed rotation and feed movement will be such that in the ultimate cutting position, the pitch cone of the blank will be in tangent relation with respect to the common tangent plane QAJ (Figures 6 and 7) along the line JA, while the pitch cone E' of the hob is tangent to said plane on its opposite side along the line AQ. The pitch cone apexes of the blank and hob will then be at J and A respectively. For the abridged type the distance JA is equal to $a-p$. When this position has been reached, the angle JQA will always be equal to the angle $\theta$ which value was used in calculating the cone angle $\gamma$ and the base radius $a$. In the manner just described, all the teeth of the gear G are finished in one continuous operation, both sides being cut and along their entire lengths.

Gears of the type described may be produced on the same machine which is used for hobbing spiral bevel gears and which is fully described in my copending application Serial No. 637,372, filed May 7, 1923. In cutting gears of the type herein described, however, the circular feed of the hob about the apex is disconnected and the hob instead is fed by hand or by power in a direction substantially perpendicular to the common tangent plane. The gear produced by the method of my invention bears the same relation with respect to a spiral bevel gear as does the common worm gear to a spur helical gear, that is, it is a worm gear modification of the bevel gear.

Figure 9:
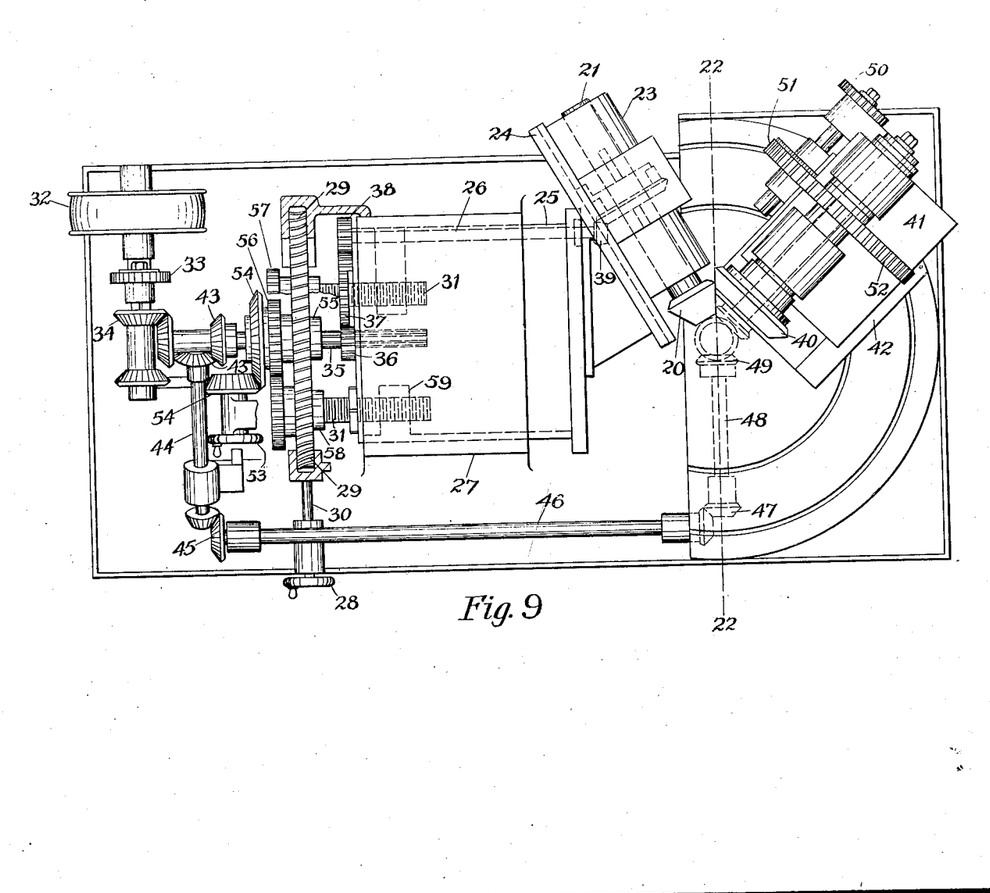
Fig. 9 is a diagrammatic plan view of a hobbing machine suitable for practising this invention.

In Fig. 9 I have illustrated diagrammatically a view of a machine suitable for practising this invention. This machine is the same as the one shown in my above mentioned pending application No. 637,372 except that the gear trains serving to rotate the feed cylinder in a timed relation with the gear and hob spindles are omitted as unnecessary in practising the present invention.

The hob 20, which in this case has a cone angle of 30°, is mounted upon the hob spindle 21 intersecting the common tangent plane 22 at an angle of 30° so that the side of the hob contacting with the gear blank is always parallel to said tangent plane. The hob spindle 21 is rotatably mounted in the cutter head 23 which is longitudinally slidable in ways formed in the top of the cutter base 24. This base 24 is pivotally mounted on the side of the large cylindrical casting or spindle 25 for movement about the center of the shaft 26 from which the hob is driven. Thus the hob is adjustable both angularly and longitudinally with respect to the axis of the spindle 25 so that its apex may be brought into any desired position with reference to the gear apex.

The spindle 25 is rotatable in the main frame 27 of the machine for the purpose of adjusting the hob for the angle $\theta$, as previously explained. This adjustment is accomplished by rotating the handwheel 28 which actuates a large worm gear 29 through the worm shaft 30. The worm gear 29 is connected to the cylinder 25 by means of three screws 31, the action of which will be explained presently.

The hob is driven from the pulley 32 through a pair of speed change gears 33, a pair of miter gears 34, the splined shaft 35, three spur gears 36, 37 and 38, the shaft 26 and the pair of bevel gears 39. The gear blank 40 is mounted in the work head 41 which is longitudinally adjustable in the horizontal ways of the work base 42 and also is angularly adjustable with respect to the frame. Thus the blank may be properly adjusted with respect to the tangent plane 22 as required. The blank is rotated in continuous intermeshing timed relation with the hob, from the pulley 32 through a pair of miter gears 43, the auxiliary shaft 44, a pair of bevel gears 45, the shaft 46, a pair of miter gears 47, the shaft 48, the miters 49, the index change gears 50, the pinion 51, and the gear 52 mounted in the work head.

During the continuous intermeshing rotation of hob and blank, a relative feed movement is imparted between these two members as already explained. The feeding of the hob into the blank may be accomplished either by power or by hand. For hand feed, the hand wheel 53 is provided which can rotate through the bevel gears 54 the sleeve 55 which is mounted concentric with the shaft 35 and which has secured to it a spur gear 56. This spur gear 56 engages three spur gears 57 each of which is keyed to one of the screws 31. These screws 31 are housed in three suitable bearings 58 formed integral with the worm gear 29. The three screws 31 thread into suitable bosses 59 which are formed integral with the cylinder 25. The worm gear 29 is locked during cutting by the worm 30, while the thrust bearings 58 maintain it in a fixed position in a vertical plane. Thus, when the three feed screws 31 are rotated the cylinder 25 carrying with it the hob 20 slowly advances in a direction perpendicular to the tangent plane 23.

From the above description, the operation of the machine will be readily understood. It is obvious that the present invention may be practised with machines of various and simpler constructions, especially where single purpose manufacturing is desired.

While I have illustrated and described a preferred embodiment of my invention, it will be understood that the invention is capable of further modification within the limits of the invention and the scope of the appended claims and this application is intended to cover any variations, uses, or adaptations of my invention, following, in general, the principles of the invention and including such departures from the present disclosure as come within known or customary practise in gear cutting and may be applied to the essential features hereinbefore set forth and as fall within the limits of the appended claims.

Having thus described my invention, what I claim is:

1. The method of producing the finishing cut on the side tooth surfaces of a longitudinally curved tooth tapered gear which consists in bringing a tool, having its cutting portions arranged in a continuous thread, into full depth cutting engagement with a tapered gear blank and rotating said tool in continuous intermeshing engagement with the blank, while rotating the blank continuously on its axis and while maintaining the angular relation between the blank and tool axes constant so that the tool sweeps out the whole finished tooth surface of the blank.

2. The method of producing the finishing cut on the side tooth surfaces of a longitudinally curved tooth tapered gear which consists in bringing a tool, having its cutting portions arranged in a continuous thread of constant pitch into full depth cutting engagement with a tapered gear blank and rotating said tool, in continuous intermeshing engagement with the blank, while rotating the blank continuously on its axis and while maintaining the angular relation between the blank and tool axes constant so that the tool sweeps out the whole finished tooth surface of the blank.

3. The method of producing a longitudinally curved tooth tapered gear which consists in positioning a tool, having its cutting portions arranged in a continuous thread, and a tapered gear blank so that they are tangent to a common plane, rotating the tool and blank in intermeshing timed relation, while imparting a positive relative feed movement between the tool and blank in a direction substantially perpendicular to said plane, so that in finish cutting position the tool sweeps out the whole finished tooth surface of the blank.

4. The method of producing the finishing cut on the side tooth surfaces of a longitudinally curved tooth tapered gear which consists in bringing a taper hob into full depth cutting engagement with a tapered gear blank and rotating said hob in continuous intermeshing engagement with the blank, while rotating the blank continuously on its axis and while maintaining the angular relation between the blank and hob axes constant, so that the hob sweeps out the whole finished tooth surface of the blank.

5. The method of producing a longitudinally curved tooth tapered gear which consists in positioning a taper hob and a tapered gear blank so that they are tangent to a common plane and rotating the hob and blank in intermeshing timed relation, while imparting a positive relative feed movement between the hob and blank in a direction substantially perpendicular to said plane, so that in finish cutting position the hob sweeps out the whole finished tooth surface of the blank.

6. The method of producing the finishing cut on the side tooth surfaces of a longitudinally curved tooth tapered gear which consists in bringing a taper hob, whose cutting portions are arranged in a continuous thread of constant pitch, into full depth cutting engagement with a tapered gear blank and rotating said hob in continuous intermeshing engagement with the blank, while rotating the blank continuously on its axis and while maintaining the angular relation between the blank and hob axes constant, so that the hob sweeps out the whole finished tooth surface of the blank.

7. The method of producing longitudinally curved teeth on the side face of a gear blank, which consists in bringing a tool, having its cutting portions arranged in a continuous thread of constant pitch, into full depth cutting engagement with the blank with its axis non-intersecting and non-parallel to the blank axis and rotating said tool in continuous intermeshing timed relation with the blank while maintaining the angular relation between the tool and blank axes constant.

8. The method of producing longitudinally curved teeth on the side face of a gear blank which consists in bringing a taper hob into full depth cutting engagement with the blank with its axis non-intersecting and non-parallel to the blank axis and rotating said hob in continuous intermeshing timed relation with the blank while maintaining the angular relation between the tool and blank axes constant.

9. The method of producing longitudinally curved teeth on the side face of a gear blank which consists in bringing a taper hob, having its cutting portions arranged in a continuous thread of constant pitch, into full depth cutting engagement with the blank with its axis non-intersecting and non-parallel to the blank axis and rotating said hob in continuous intermeshing timed relation with the blank while maintaining the angular relation between the tool and blank axes constant.

10. The method of producing longitudinally curved teeth on the side face of a gear blank which consists in bringing a taper hob, into full depth cutting engagement with the blank with its apex offset from the blank axis and rotating said hob in continuous intermeshing timed relation with the blank while maintaining the angular relation between the tool and blank axes, constant.

11. The method of producing longitudinally curved teeth on the side face of a gear blank which consists in bringing a taper hob, having its cutting portions arranged in a continuous thread of constant pitch, into full depth cutting engagement with the blank with its apex offset from the blank axis and rotating said hob in continuous intermeshing timed relation with the blank while maintaining the angular relation between the tool and blank axes constant.

12. The method of producing the finishing cut on the side tooth surfaces of a longitudinally curved tooth tapered gear which consists in bringing a tool, which is a counterpart of a mating gear, into full depth cutting engagement with the blank with its axis offset from the apex of the blank and rotating said tool in continuous intermeshing timed relation with the blank while maintaining the angular relation between the tool and blank axes constant, so that the tool sweeps out the whole finished tooth surface of the blank.

13. The method of producing a longitudinally curved tooth gear which consists in bringing a tool, having its cutting portions arranged in a continuous thread, into full depth cutting engagement with a tapered gear blank with the axis of the tool non-intersecting and non-parallel to the blank axis, and rotating said tool in continuous intermeshing timed relation with the blank while maintaining the angular relation between the tool and blank axes constant.

14. The method of producing a longitudinally curved tooth gear which consists in bringing a taper hob into full depth cutting engagement with a tapered gear blank with the axis of the hob non-intersecting and non-parallel to the blank axis and rotating said hob in continuous intermeshing timed relation with the blank while maintaining the angular relation between the hob and blank axes constant.

15. The method of producing a longitudinally curved tooth gear which consists in bringing a taper hob, having its cutting portions arranged in a continuous thread of constant pitch, into full depth cutting engagement with a tapered gear blank with the axis of the hob non-intersecting and non-parallel to the blank axis and rotating said hob in continuous intermeshing timed relation with the blank while maintaining the angular relation between the hob and blank axes constant.

16. The method of producing a longitudinally curved tooth gear which consists in positioning a tool, having its cutting portions arranged in a continuous thread, and a tapered gear blank in tangential relation with the axis of the hob extending diagonally of the face of the blank and rotating said hob in intermeshing timed relation with the blank while imparting a relative feed movement between the hob and blank such that in finish cutting position the angular relation between the hob and blank axes is maintained constant and the hob sweeps out the whole finished tooth surface of the blank.

17. The method of producing a longitudinally curved tooth gear which consists in positioning a tool, having its cutting portions arranged in a continuous thread of constant pitch, and a tapered gear blank in tangential relation with the axis of the tool extending diagonally of the face of the blank and rotating said tool in intermeshing timed relation with the blank while imparting a relative feed movement between the tool and blank such that in finsh cutting position the angular relation between the tool and blank axes is maintained constant and the tool sweeps out the whole finished tooth surface of the blank.

18. The method of producing a longitudinally curved tooth gear which consists in positioning a taper hob and a tapered gear blank in tangential relation with the axis of the hob extending diagonally of the face of the blank and rotating said hob in intermeshing timed relation with the blank while imparting a relative feed movement between the hob and blank such that in finish cutting position the angular relation between the hob and blank axes is maintained constant and the hob sweeps out the whole finished tooth surface of the blank.

19. The method of producing a longitudinally curved tooth gear which consists in positioning a taper hob, having its cutting portions arranged in a continuous thread of constant pitch, in tangential relation with a tapered gear blank with the axis of the hob extending diagonally of the face of the blank and rotating said hob in intermeshing timed relation with the blank while imparting a relative feed movement between the hob and blank such that in finish cutting position the angular relation of the hob and blank axes is maintained constant and the hob sweeps out the whole finished tooth surface of the blank.

20. The method of producing a longitudinally curved tooth gear which consists in positioning a taper hob and a gear blank so that they are tangent to a common plane with the axis of the hob projected into the tangent plane perpendicular to a line connecting the hob and gear apexes and rotating the hob and blank in intermeshing timed relation while imparting a positive relative feed movement between the hob and blank in a direction substantially perpendicular to said tangent plane so that in finish cutting position the hob sweeps out the whole finish tooth surface of the blank.

21. The method of producing a longitudinally curved tooth gear which consists in bringing a taper hob and a gear blank into full depth cutting engagement with the axis of the hob projected into the plane tangent to the pitch surfaces of hob and blank perpendicular to a line connecting the hob and gear apexes and rotating the hob and blank in continuous intermeshing timed relation while maintaining the angular relation between the hob and blank axes constant.

22. The method of producing a longitudinally curved tooth gear which consists in bringing a hob, having its cutting portions arranged in a thread which in development is an Archimedean spiral, into full depth cutting engagement with a tapered gear blank and rotating the hob and blank in continuous intermeshing timed relation while maintaining the angular relation between the hob and blank axes constant.

23. The method of producing a longitudinally curved tooth gear which consists in positioning a hob, having its cutting portions arranged in a thread which in development is an Archimedean spiral, and a tapered gear blank so that they are tangent to a common plane and rotating the hob and blank in intermeshing timed relation while imparting a positive relative feed movement between the hob and blank in a direction substantially perpendicular to said tangent plane.

24. The method of producing a longitudinally curved tooth gear which consists in bringing a hob, having its cutting portions arranged in a thread which in development is of modified involute form, into full depth cutting engagement with a tapered gear blank and rotating the hob and blank in continuous intermeshing timed relation while maintaining the angular relation between the hob and blank axes constant.

25. The method of producing a longitudinally curved tooth gear which consists in positioning a hob, having its cutting portions arranged in a thread which in development is of modified involute form, and a tapered gear blank so that they are tangent to a common plane and rotating the hob and blank in intermeshing timed relation while imparting a positive relative feed movement between the hob and blank in a direction substantially perpendicular to said tangent plane.

26. The method of producing the finishing cut on the side tooth surfaces of a longitudinally curved tooth tapered gear which consists in employing a hob of constant pitch, adapted to cut two adjacent side faces of the gear teeth simultaneously, bringing said hob into full depth cutting engagement with the blank with its axis extending diagonally across the tooth zone of the blank and rotating said hob in continuous intermeshing engagement with the blank, while maintaining the angular relation between the hob and blank axes constant, so that the hob sweeps out the whole of two adjacent finished tooth surfaces of the blank.

27. The method of producing the finishing cut on the side tooth surfaces of a longitudinally curved tooth tapered gear which consists in employing a taper hob, which is adapted to cut two adjacent side faces of the gear teeth simultaneously, bringing said hob into full depth cutting engagement with the blank with its axis extending diagonally across the tooth zone of the blank and rotating said hob in continuous intermeshing engagement with the blank, while maintaining the angular relation between the hob and blank axes constant, so that the hob sweeps out the whole of two adjacent finished tooth surfaces of the blank.

NIKOLA TRBOJEVICH.